United States Patent [19]

Watanabe

[11] 4,433,404
[45] Feb. 21, 1984

[54] VARIETY PLAYING SOUND REPRODUCING DEVICE

[75] Inventor: Katsumi Watanabe, Kawasaki, Japan

[73] Assignee: Ozen Corporation, Tokyo, Japan

[21] Appl. No.: 307,534

[22] Filed: Oct. 1, 1981

[30] Foreign Application Priority Data

Jul. 24, 1981 [JP] Japan .................. 56-116142

[51] Int. Cl.³ .................. G11B 3/00; G11B 17/00
[52] U.S. Cl. .................. 369/66; 369/31; 369/67; 192/45
[58] Field of Search .................. 369/65, 66, 67, 31; 192/45

[56] References Cited

U.S. PATENT DOCUMENTS

| | | | |
|---|---|---|---|
| 2,232,090 | 2/1941 | Anderson | 192/45 |
| 3,299,782 | 1/1967 | Sunday | 192/45 |
| 3,383,114 | 5/1968 | Ryan | 369/31 |
| 3,529,832 | 9/1970 | Goetz et al. | 369/31 |

*Primary Examiner*—Steven L. Stephan

*Attorney, Agent, or Firm*—Basile, Weintraub & Hanlon

[57] ABSTRACT

A one-way clutch is provided between a constant torque spring motor and a turn table. A locking projection in the one-way clutch acts to engage, through a rotatable locking piece, a locking face facing to the opposite direction of rotation of the record disc for reproducing sounds.

By virtue of this locking driving force of the constant torque spring motor is transmitted to the turn table, while in the winding operation, applied force can be released by the slant face inclined toward the direction of rotation of the record disc and thereby can be disconnected with the turn table. Due to this simple construction, a one-way clutch applicable to this kind of constant torque spring motor for use in a sound reproducing device can be easily fabricated and assembled. In order to prevent any harmful frictional slippage of the pickup on the face of record disc by reverse turning of an indexing disc, another one-way clutch of similar construction is disposed between the indexing disc and the face plate.

6 Claims, 8 Drawing Figures

FIG. 7
(A)
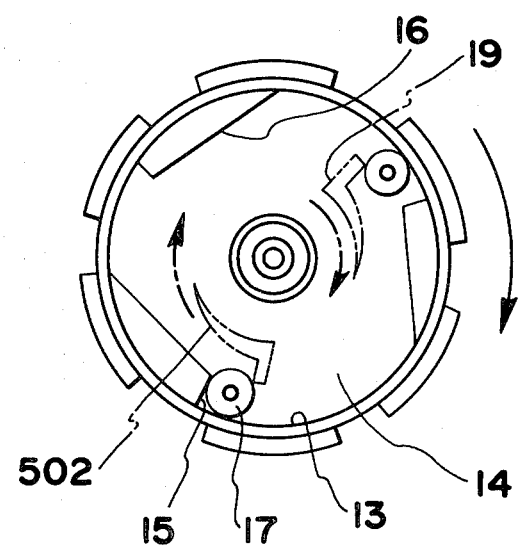
(B)
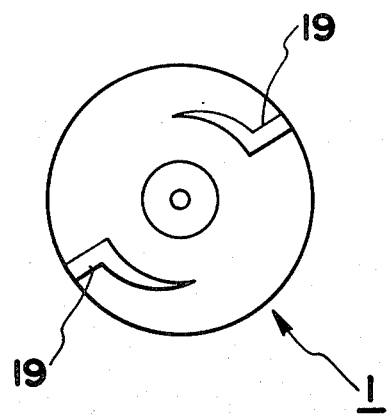

VARIETY PLAYING SOUND REPRODUCING DEVICE

BACKGROUND OF THE INVENTION

1. Field of the Invention

This invention relates to a sound reproducing device, and more particularly, to a multi-groove sound reproducing device which is driven by a constant torque spring motor energized by pulling a pull string and includes a record disc having a plurality of items recorded in a corresponding number of recorded grooves and can be reproduced either selectively or irregularly.

2. Description of the Prior Art

Heretofore, among sound reproducing devices for playing multiplicity of recorded items, there has been provided a device which comprises: a casing showing the indexed items to be played, an indexing disc which can be manually rotated to set a specific selected record groove for playing next and a spring motor as a driving source (refer to Japanese Patient Publication No. 17303/67).

The present invention aims to provide a further improved sound reproducing device which permits non-intentional irregular reproduction in addition to selective reproduction and which further incorporating a unique one-way clutch which facilitates ready manufacture and assembly of parts to be used.

Incidentally, there has also been provided a sound reproducing device which comprises: a constant torque spring motor as its power source, a one-way clutch biased by a coil spring which is interposed between a turn table and the constant torque spring motor for preventing accompanied rotation of the turn table in winding the constant torque spring motor (refer to Japanese Utility Model Publication No. 28408/78).

The above-mentioned coil spring type clutch means must be fabricated and assembled with great care and accuracy, otherwise, the one-way clutch may function incompletely and also cause the turn table to rotate. Thus, the device not only damages the record disc but shifts the record disc from its already selected position.

SUMMARY OF THE INVENTION

The present invention aims to eliminate the drawbacks of the conventional one-way clutch means.

Accordingly, an object of the present invention is to provide a one-way clutch to be interposed between a constant torque spring motor and a turn table.

Another object of the present invention is to provide a one-way clutch which permits free rotation of the turn table and record disc in selecting operation without accompanying rotation of the constant torque spring motor and enables another way of rotation of the constant torque spring motor alone without accompanying undesired rotation of the turn table and the record disc.

A further object of the present invention is to provide a one-way clutch for use in a multi-groove sound reproducing device which can be readily fabricated and assembled.

A still further object of the present invention is to provide a sound reproducing device which permits intentional selection of any specific item to be reproduced and non-intentional playing of various recorded items in irregular order.

A yet further object of the present invention is to secure the above-mentioned irregularity in non-intentionally reproducing recorded items.

A still further object of the present invention is to prevent undesired frictional engagement of the pickup with record disc when the indexing disc is rotated in the selecting operation in a direction opposite to the direction of rotation for sound reproduction.

A final object of the present invention is to provide a construction which assures releasing of stylus force and ready returning of the pickup to the starting point of sound reproduction.

According to the present invention, there is provided a one-way clutch which consists of a guide face defined between opposedly facing faces of a constant torque spring motor and a turn table co-axially assembled with respect to a center shaft such that the guide face surrounds the center shaft; a holding space defined by the guide face; a plurality of locking pieces held within the holding space; a plurality of locking faces projecting radially inward from the guide face toward the center shaft and facing to the contrary direction of rotation of the record disc for sound reproduction, a plurality of locking projections which rotate within the holding space and engage the locking faces through the locking piece thereby transmitting driving force given by the constant torque spring motor to the turn table; a plurality of slant faces, each of which being inclined from the tip ends of the respective locking face projecting to the center shaft toward the guide face, the function of which permits rotational movement of the locking pieces so as to prevent their engagement with the locking faces.

By virtue of this construction, during winding of the constant torque spring motor, rotational force is not imparted to the turn table.

A string for winding the constant torque spring motor is taken up, upon completion of sound reproduction, by the reel of the constant torque spring motor and then stretched straight under tension caused by hanging of the string by the rim of an aperture formed in the casing through which the string passes.

By the stretching of the string, a sound transmitting member imparting stylus force to the pickup is raised upward, such that the pickup immediately reverts back to the starting point of sound reproduction by a return spring. Thus, the pickup is held at its raised position spaced apart from the record disc.

Since the turn table is driven by the constant torque spring motor through the one-way clutch means, after completion of reproducing rotation, the turn table still continues by inertia for several turns of rotation.

It is very rare that the turn table rotates by inertia at an integer or the same number of turns per each sound reproduction.

Accordingly, positioning of at least three locking faces of the one-way clutch at the points which unequally divide the guide face circle results in a different match of a locking face and a locking piece which is pushed by and engaged with any one of the locking projections.

In this way, the time interval necessary to loosen the pull string so as to impart necessary stylus force to the record disc and the time interval necessary for starting rotation of the record disc will shift irregularly from one playing to next so as to enable irregular playing of the recorded items to be performed.

On the other hand, an indexing disc is fixedly attached to the center shaft which is also fixed to the turn table.

The indexing disc is constructed such that it is rotated to set to any one of the recorded items marked on the casing and thereby any one of the selected record grooves can be positioned for next engagement with the pickup depending upon the setting of the indexing disc to the marked items.

This enables intentional selection of any desired record groove.

Interposed between the indexing disc and the casing is a one-way clutch which consists of a guide face surrounding the center shaft, a holding space defined by the guide face, a plurality of locking pieces disposed in the holding space, a plurality of locking faces radially and inwardly projecting from the guide face toward the center shaft and facing toward the direction of rotation of the record disc for sound reproduction, a plurality of locking projections which are rotated within the holding space and take locking positions with the locking face through the locking piece to thereby transmit the extent of rotation of the indexing disc to the center shaft, the turn table and to the record disc, and a plurality of slant faces inclined from the innermost tip end of the locking faces toward the guide face.

By virtue of this one-way clutch means, reverse rotation of indexing disc opposite to the direction of sound reproduction of the record disc can be entirely prevented.

Assuming that the operator already pulled the string and rotated the constant torque spring motor in a reverse direction for energizing the motor and then taken his hand off the string and such that the string has been loosened, then the turn table will now be placed in a lowered position imparting necessary stylus force to the record disc. Even if the operator tries, under this condition, to rotate the indexing disc in a reverse direction which otherwise would result in reverse rotation of the turn table, such reverse rotation of the indexing disc will be prevented.

By virtue of this double one-way clutch, any harmful slippage of the reproducing stylus of the pickup on the record disc can be entirely prevented.

As explained above, according to the variety playing sound reproduction device of the present invention, unintentional playing of non-specific recorded items in irregular order in addition to the normal manner of intentional selection of any specific item can be made as desired.

Moreover, the one-way clutch used in the present invention does not use any coil spring. Accordingly, fabrication and assembly of all related parts can be readily be done and the clutch functions with a high reliability suitable for sound reproduction.

Also, as the sound transmitting member of the device is lifted up by the pull string itself when it is stretched straight under tension, the pickup can be smoothly returned back to the starting point of sound reproduction upon completion of one playing.

BRIEF DESCRIPTION OF THE DRAWINGS

FIG. 7(A) is a plan view of a one-way clutch of the present invention at the side of the turn table: and FIG. 7(B) is a bottom view of the constant torque spring motor.

DETAILED DESCRIPTION OF THE INVENTION

FIGS. 1 through 7(B) show a preferred embodiment of the present invention.

Figure 1:
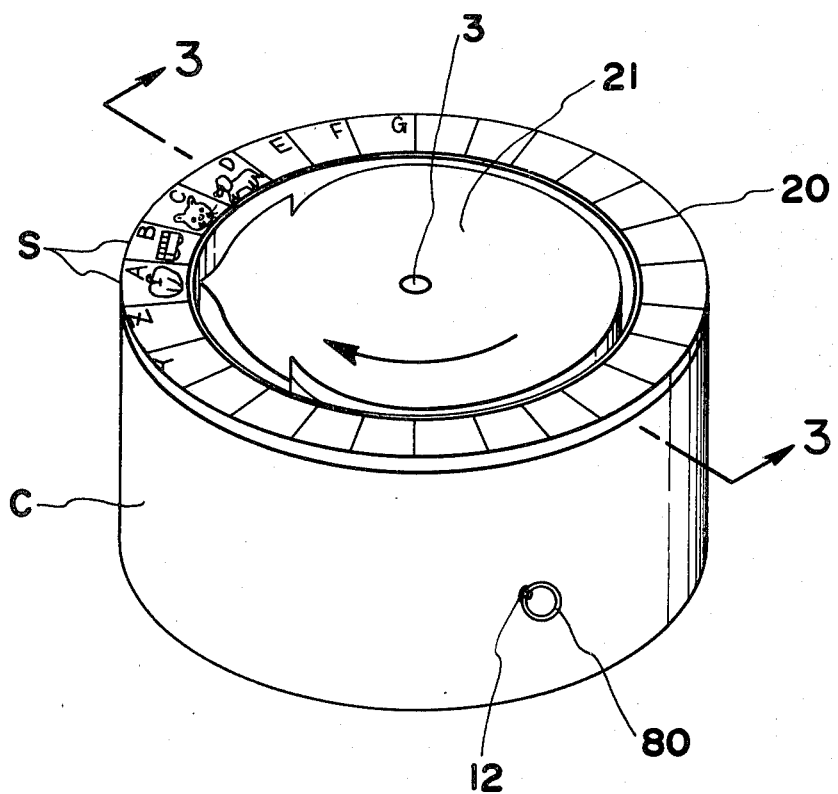
FIG. 1 is a perspective view of a multi-way sound reproduction device constructed according to a preferred embodiment of the present invention.

As shown in FIG. 1, casing C consists of a circular cylinder of comparatively short height on the top end of which a face plate 20 having a concave central portion is crowned. The face plate 20 has at its upper periphery a number of indicia showing the recorded items S to be reproduced.

The indexed items S correspond in number and kind to the items recorded in the record grooves formed in a record disc, as explained later, which is rotatably supported in the casing C, and, further, are disposed in such a manner as to maintain a predetermined locational relationship with respect to both the introductory part of respective groove and the position of the pickup resting at the starting point of sound reproduction.

A center shaft 3 projects upward from the inside of the casing C passing through the center of the concave portion of the face plate 20, around which an indexing disc 21 is fixedly attached so as to be capable of being rotated together with the center shaft 3.

In this way, the indexing disc 21 is received in the concave portion of the face plate 20 and is rotatably held so as to be rotated for selecting the above-mentioned recorded items S. In the drawings, numeral 80 denotes a ring attached to the free tip end of a string 12 and numeral 81 is an aperture in the casing C through which the string 12 is passed.

Figure 2:
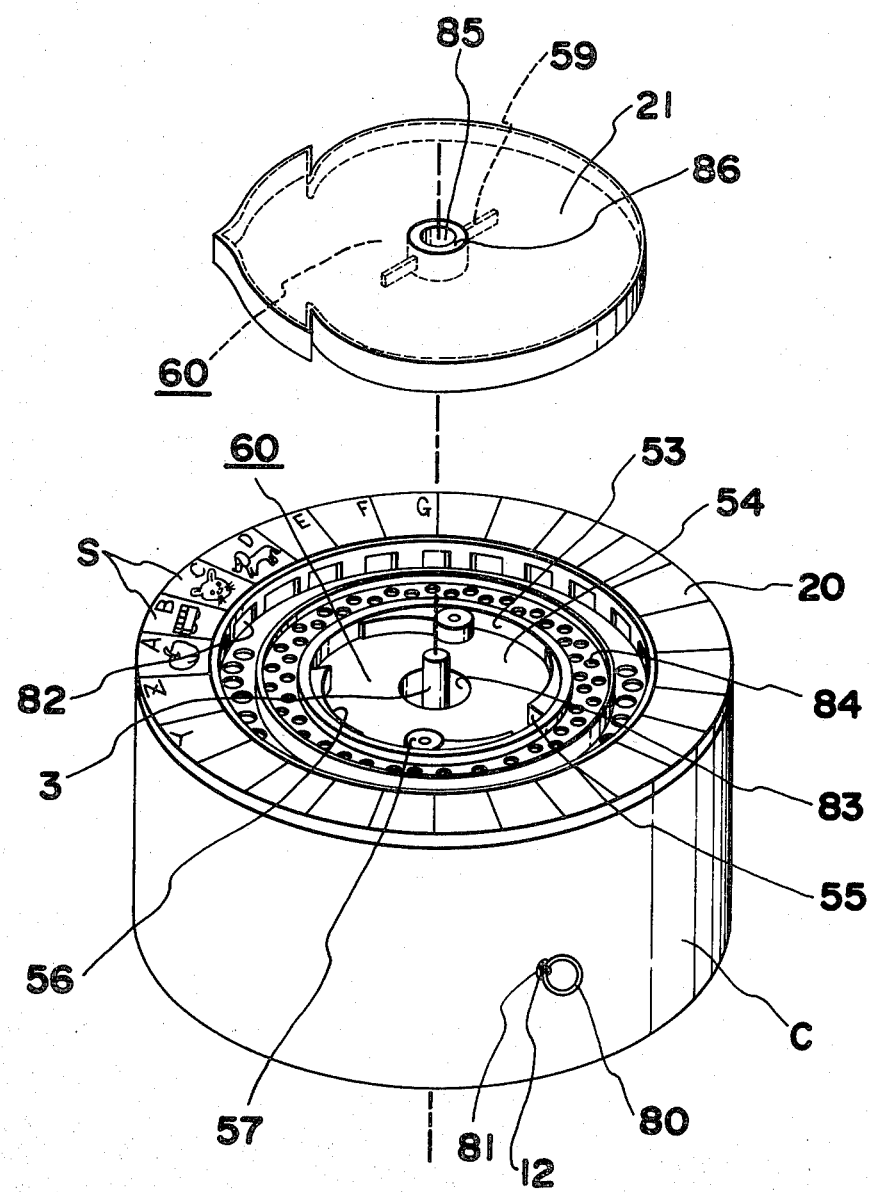
FIG. 2 is an exploded perspective view of the device of the present invention.

FIG. 2 shows the construction of the device of this invention disposed within and around the concave portion of the face plate 20, by removing the indexing disc 21 away from the casing C.

On the inner peripheral wall of the concave portion of the face plate 20, a number of through bores 82 are opened to the interior of the casing C allowing free communication of reproduced sound.

On the upper face and at the center of the concave portion of the housing C, a bore 83 for receiving a hub is formed through which the center shaft 3 passes and extends into the concave portion. An annular upright guide face 53 surrounds the center shaft 3 so that the inner space defined by the guide face 53 constitutes a holding space.

On the outer face surrounding the guide face 53, a number of sound holes 84 are provided each of which will take a position to match the upper face of a speaker cone as explained later.

Inside the guide face 53, four sets of radially and inwardly projecting cam pieces are provided, each of which consists of a locking face 55 extending radially toward the center shaft 3 and facing opposite from the direction of rotation of the record disc for sound reproduction and a contiguous slant face 56 slightly inclining from the tip end of the locking face 55 toward the face of the guide face 53. A pair of locking pieces 57 having a flat and round configuration and larger in diameter than the length of the projection of the locking face 55 are disposed within the holding space 54 and are capable of being moved along the slant face 56 and the guide face 53.

The indexing disc 21 is concave at its reverse side to constitute a hollow space and a downwardly projection hub 86 having a shaft bore 85 is disposed at the center of the indexing disc 21.

The center shaft 3 is fixedly inserted into the shaft bore 85. Thus the hub 86 of the indexing disc is inserted into and journally received for rotation by the hub receiving bore 83, with the center shaft 3 being inserted in the shaft bore 85.

At the upper part of the hub 86 of the indexing disc 21 a pair of locking bars or projections 59 are disposed within the holding space 54 so as to extend radially and outwardly but with a length which does not reach to the innermost end of each locking face 55.

The above-mentioned guide face 53, locking faces 55, slant faces 56, locking piece 57 and locking bars or projections 59 constitute, as a whole, a one-way clutch 60 when the indexing disc 21 is fixedly attached around the center shaft 3 and is received in the concave portion of the face plate 20. By virtue of this mechanism, the center shaft 3 and, in turn, the record disc can be prevented from being rotated in a direction opposite to the direction of sound reproduction, namely, the reverse direction of rotation of the record disc.

Figure 3:
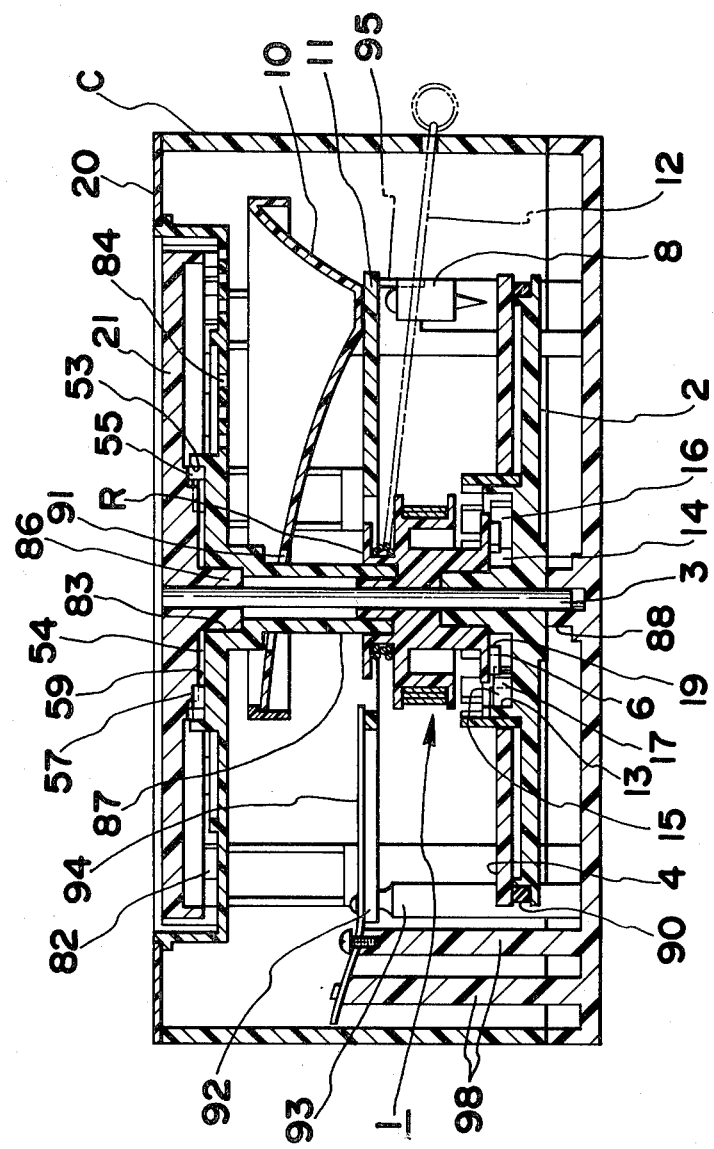
FIG. 3 is a vertical cross-sectional view of the device taken along line 3—3 of FIG. 1.

This construction of the device is also shown in FIG. 3. FIG. 3 shows the internal construction of the device received in the casing C. From the back face of the face plate 20, an annular sleeve 87 depends downward at the outer periphery of the central boss defining the bore 83 for receiving the hub. At the bottom center of the casing C an upstanding bearing boss 88 is disposed in such a manner that it projects upward toward the aforesaid sleeve 87 depending from the face plate 20.

The center shaft 3 is received by the bearing boss 88 at its lower end, while the upper end is received by the hub receiving bore 83 through the hub 86 of the indexing disc.

To and around the center shaft 3, a turn table 2 is fixedly attached so as to be supported on the upper end face of the bearing boss 88.

Figure 4:
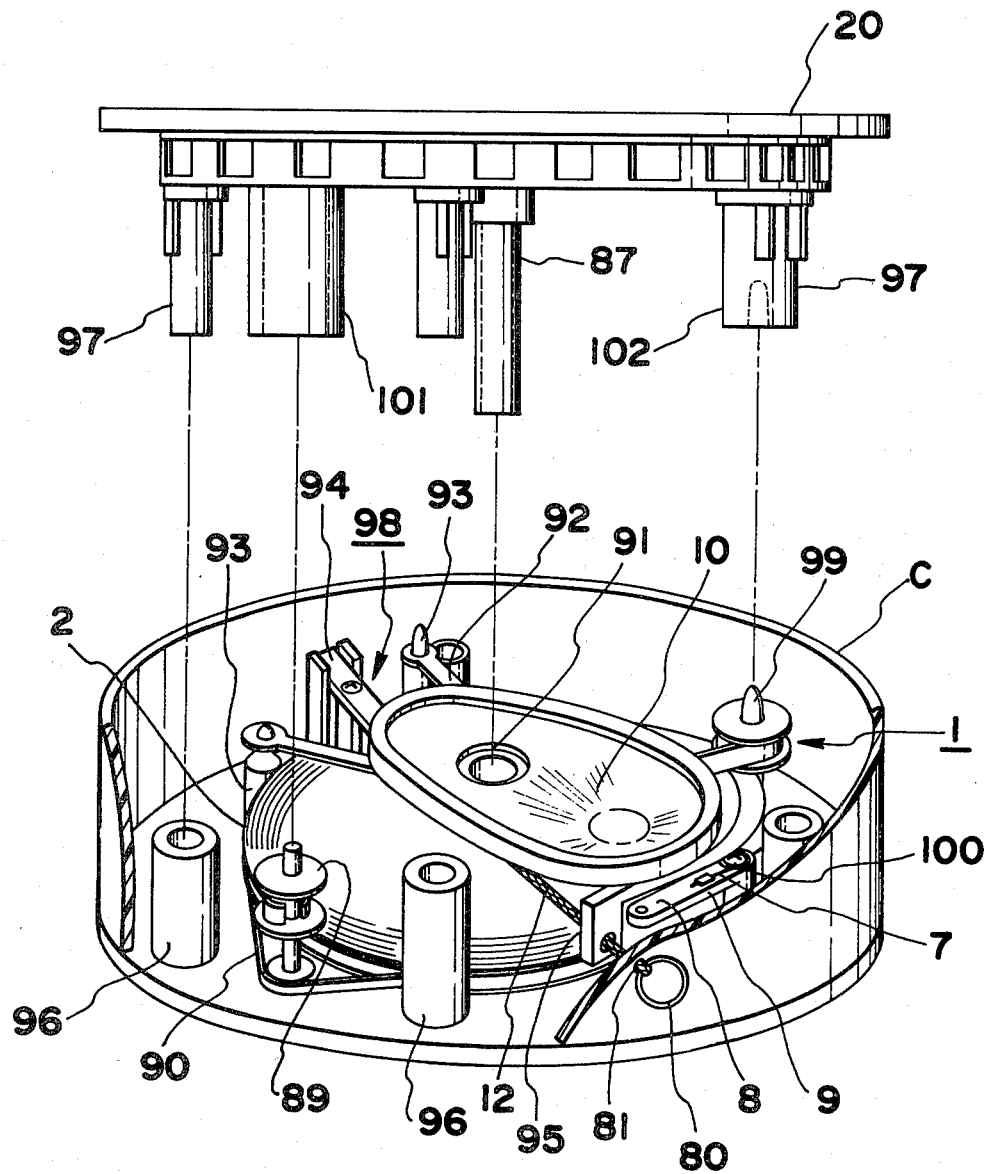
FIG. 4 is an exploded perspective view of the device, a part of the casing being cut away and the face plate of the device being moved away from the casing.

A record disc 4 is fixed on the upper face of the turn table 2, the peripheral rim of which and the periphery of the record disc 4 constitute a pulley groove around which a belt 90 is extended to rotate a governor 89, as shown in FIG. 4.

On the turn table 2, one component of the constant torque spring motor 1, namely, the driving body is co-axially disposed with and freely rotatable with respect to the center shaft 3. At the upper part of the constant torque spring motor 1, a reel R for taking up a winding string 12 is formed integral with the spring motor 1.

The sleeve 87 is inserted into an annular groove formed on the upper face of the reel R, thereby slightly depressing the reel R, the constant torque spring motor 1 and the turn table 2 restraining axial upward movement thereof as a whole.

Between the confronting faces of the constant torque spring motor 1 and the turn table 2, a one-way clutch denoted as numeral 6 is interposed.

In the drawing, numeral 10 denotes a speaker cone, the vibrating diaphragm of which has an aperture 91 through which the sleeve 87 passes and extends downward. The converged lower end of the speaker cone 10 passing through the sleeve 87 is fixedly attached to the sound transmitting member 11 and is mounted on a mounting post 98 being supported by a mounting arm 92 which constitutes a cantilever. The transmitting member 11 is resiliently urged against the recorded face of the record disc 4 by a leaf spring 94 disposed in the casing C.

A pickup 8 is disposed beneath the one end of the sound transmitting member 11. The other lengthwise end of the sound transmitting member 11 with respect to the center shaft 3 constitutes a mounting arm 92 such that the pickup 8 is floatably lifted and lowered between the record disc 4 and the sound transmitting member 11.

The sound transmitting member 11 is normally urged by the leaf spring 94 to push the pickup 8 into engagement with the record disc 4. However, the sound transmitting member 11 has a retaining piece 95. When the pull string 12 is passed through the retaining piece 95 and is stretched straight under tension, the string 12 will hold the sound transmitting member 11 such that the sound transmitting member will not be lowered and push the pickup 8 toward the record disc 4.

The detailed construction of the one-way clutch 6 and the other sub-assemblies disposed in the casing C can be better understood by the following explanation and by referring to FIG. 4 through FIGS. 7(A) and 7(B).

Figure 5:
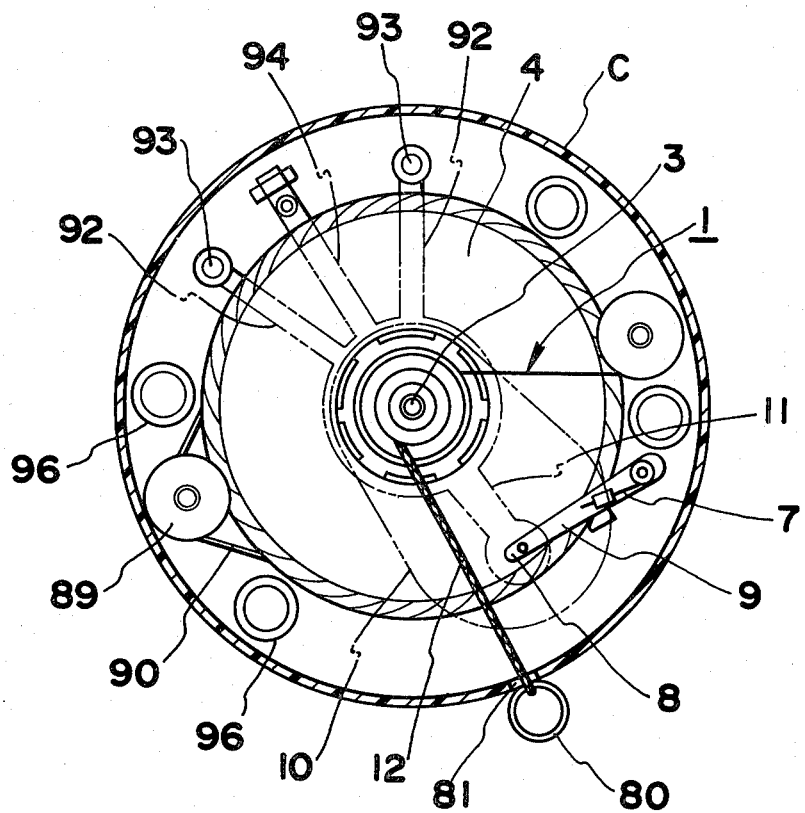
FIG. 5 is a plan view showing the interior of the device.

FIG. 4 shows the inner construction of the casing C with its side wall partly cut away and the face plate 20 having been moved upward. FIG. 5 is a plan view showing the inside of the casing C. Adjacent to the peripheral end of the casing C, a plurality of upstanding cylindrical assembly posts 96 are disposed on the bottom of the casing.

The face plate 20 has a number of upright posts 97 corresponding to the assembly posts 96 in order to assure male-female coupling of the face plate 20 and the casing C.

In the casing C, there are disposed several other posts or the like, that is, a post assembly supporting the stylus force leaf spring 98, a bearing (not shown) for receiving a governor 89, a post 102 for receiving the other component 99 of the constant torque spring motor 1 and a post 100 supporting the pickup 8, see FIG. 4. The pickup 8 is attached to the free end of the tone arm 9, which is swingably attached around the post 100 so as to be capable of swinging back and forth between the starting point of sound reproduction (outer periphery) and the end point thereof (central part) of the record disc 4. The tone arm is urged by a return spring 7 to normally move both toward the starting point of sound reproduction and away from the face of the record disc 4.

The string 12 for winding the constant torque spring motor 1 is passed through an aperture formed in the retaining piece 95 supporting the sound transmitting member 11 and then through an aperture 81 formed through the casing C and is tied to the handle ring 80 so as to be held on the casing C.

In FIG. 4, numeral 101 denotes a governor cylinder for receiving therein the governor 89 under slidable contact between the governor and the inner surface of the cylinder.

Numeral 102 is a depending post for supporting the upper axial end 99 of the constant torque spring motor 1.

FIGS. 3, 6, 7(A) and 7(B) illustrate, in detail, the construction of the one-way clutch 6 interposed between the constant torque spring motor 1 and the turn table 2.

In the holding space 6 around the center shaft 3 of the turn table 2, there are provided a plurality of cam piceces each of which consists of a locking face 15 extending radially toward the center shaft 3 and facing to the contrary direction of rotation of sound reproduction of the record disc 4 and a slant cam surface 16 slightly inclined from the top of the locking face 15 toward the guide surface 13 in the direction of the rotation of the record disc 4 for sound reproduction.

Figure 6:
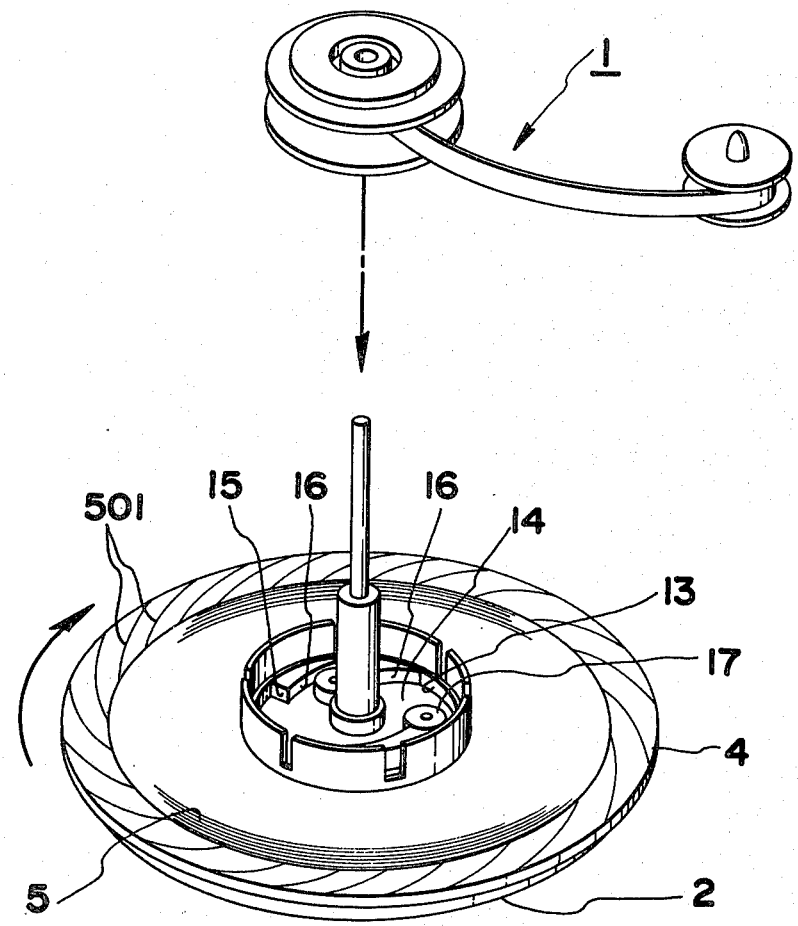
FIG. 6 is an exploded perspective view showing a turn table and record disc sub-assembly and a constant torque spring motor sub-assembly.

Further there are received a plurality of locking pieces 17 having a flat and round configuration so as to be slidably guided by both the guide face 13 and the slant cam face 16. The locking pieces 17 have a diameter larger than the radial length of the locking face 15 as shown in FIG. 6.

In the drawing, the locking pieces are two in number and the record disc 4 has a plurality of recorded grooves 5 each having a corresponding introductory groove 501.

Assuming that the arrow line shows the direction of sound reproduction of the record disc 4, any introductory groove of the specifically selected groove 5 must be positioned immediately before the pickup. This can be done by merely setting the indexing disc to the indicated item to be played.

As shown in FIG. 7(A), the locking faces 15 are positioned at points along the circle of guide face 13 and divide the circle into three unequally divided sections, while as shown in FIGS. 7(A) and 7(B), on the reverse side of the constant torque spring motor 1 there are disposed two projections 19 extending radially and along the circle of rotation of the spring motor 1.

The projections 19 are arranged such that the outermost end of each projection 19 does not contact the innermost end of the locking face 15.

Accordingly, when the constant torque spring motor 1 is mounted on the turn table 2 as shown by the arrow and the dotted line in FIG. 6 and the constant torque spring motor 1 is rotated by winding in a direction opposite to that of sound reproduction, such winding can be done freely and smoothly without causing rotation of the record disc 4.

On the other hand, during the time of rotation for sound reproduction, the locking pieces 17, as shown in FIG. 7(A), are held between the locking faces 15 and the locking projections 19, such that the constant torque spring motor 1 and the turn table 2 engage each other and enable rotation thereof as a whole in the direction of sound reproduction of the record disc 4.

As seen in FIGS. 7(A) and 7(B), the innermost tip ends of the locking projections 19 are directed toward the direction of rotation of the record disc 4 for sound reproduction so as to bias the locking piece 17 toward the guide face during rotation.

The variety playing sound reproduction device according to the above-described embodiment can be operated as mentioned below.

When the constant torque spring motor 1 has not yet been energized by winding, the string 12 is stretched straight by the tension given by both the surplus driving force of the spring motor and the holding of the free end of the string by the casing C.

Accordingly, the sound transmitting member 11 is held upward by the tightly stretched string without imparting any stylus force to the pickup 8, so that the pickup is positioned at the starting point of sound reproduction and is lifted away from the record disc.

During turning of the indexing disc 21 in the direction of the arrow line 1 of FIG. 1 for setting the pointed tip end to the item indicated for playing, the turn table 2 rotates the record disc 4 fixedly disposed thereon such that the introductory groove 501 of the record groove 5 corresponding to the selected item S can be positioned just before the pickup 8 positioned at the starting point of sound reproduction.

Next, if the operator pulls the string 12 for winding the constant torque spring motor and then takes his hand off the string, the constant torque spring motor starts rotation and causes the string to be taken up by the reel R of the spring motor while it remains in a loosened state.

At the moment when the operator has taken his hand off the string, the string begins to loosen. Therefore, the sound transmitting member 11 is instantly lowered to impart the necessary stylus force to the pickup 8.

Upon completion of sound reproduction, the constant torque spring motor will stop due to the tension of the string 12 caused by the holding of the string on the casing C, while the turn table 2 and record disc 4 still continues rotation for several turns by inertia of the rotating member and due to the one-way clutch 6 before it finally stops.

It can be readily understood that the rotation of the turn table 2 due to inertia will very rarely be exactly an integer.

Prior to the continued rotation of the turn table 2 due to inertia, the string 12 has already been stretched straight due to the tension given by the constant torque spring motor and the holding action of the casing C, so that the sound transmitting member is raised upward which allows returning of the pickup 8 to the starting point of sound reproduction.

The positions of each of the locking faces 15 are arranged at the unequally divided peripheral portion of the one-way clutch 6, and the position where the turn table rotated by inertia stops are unknown to the operator.

And yet, these relative positions and the amount of continued rotation of the turn table 2 vary for each playing of the record disc for sound reproduction. Namely, there are certain time intervals necessary to effect locking of the locking face 15 and the locking projection 19 via the locking piece 17, such that the timing of rotation of the turn table 2 and the record disc 4 may deviate slightly from the time interval for effecting engagement of the pickup 8 with the face of the record disc due to loosening of the string 12. Accordingly, the introductory groove of any record groove which the pickup 8 will engage on starting the next playing of the record disc will vary in an irregular manner thereby permitting a so-called random playing.

As explained above, the device according to the embodiment of the present invention enables both an intentional selection of the recorded item to be reproduced next and an unintentional irregular playing of the recorded groove.

Moreover, construction of the one-way clutch adopted in the present invention allows a sufficient number of turns of rotation of the turntable due to inertia. Also, the unequally divided position of the locking faces combined with rotatable indexing disc mechanism provides a very simple and effective switching means.

I claim:

1. An improved sound reproducing device comprising:

a casing;

a center shaft mounted within the casing;

a turn table fixedly attached to the center shaft;

a record disc mounted on the turn table and having a plurality of recorded grooves, each having a start and an end point of sound reproduction;

a constant torque spring motor for driving the turn table;

a tone arm mounted within the casing;

a pickup carried by the tone arm, the pickup being positioned above the record disc;

return spring means mounted within the casing for biasing the pickup toward the start point of sound reproduction on the record disc;

a sound transmitting member disposed within the casing;

a speaker connected to the sound transmitting member, the sound transmitting member being interposed between the tone arm and the speaker;

a pull string for winding the constant spring torque motor, the pull string releasing engagement of the pickup with the record disc when the string is stretched straight under tension to allow the pickup to return to the start point of sound reproduction on the record disc;

the constant torque spring motor and turntable each having a face that coaxially confronts the face of the other, a one-way clutch interposed between the turn table and the constant torque spring motor for driving the turn table in a direction of sound reproduction of the record disc, the one-way clutch comprising;

a guide face on one of the confronting faces surrounding the center shaft and defining a holding space therearound;

a plurality of locking faces projecting radially inward from the guide face and facing a direction opposite from the direction of rotation of the record disc for sound reproduction, the locking faces being unequally spaced around the guide face;

a plurality of slant faces, each continuously inclining from a tip end of a locking face toward the guide face;

a plurality of generally circular locking pieces freely movable within the holding space around the center shaft, the locking pieces having a diameter larger than the extent of protection of the locking face from the guide face; and a plurality of locking projections extending radially about the center shaft, the locking projections being disposed on the other of the two co-axially confronting faces of the constant torque spring motor and the turn table.

2. The improved sound reproducing device for reproducing a plurality of recorded grooves as claimed in claim 1 wherein the holding space is formed in the turn table and the innermost tip end of the locking projection is directed to the direction of rotation for sound reproduction of the record disc so as to bias the locking pieces toward the guide face.

3. The improved sound reproducing device as claimed in claim 1 wherein stretching of the pull string is effected by the combination of the remaining surplus driving force of the constant torque spring motor and the holding of the string by the engagement of a ring handle of the string with a casing.

4. The improved sound reproducing device for reproducing a plurality of recorded grooves as claimed in claim 1 wherein the sound transmitting member attached to the pickup is lifted by the stretched straight string allowing the pickup to move away from the record disc.

5. The improved sound reproducing device for reproducing a plurality of recorded grooves as claimed in claim 1 wherein the one-way clutch has at least three sets of locking faces and slant faces and the guide face in the holding space is unequally divided by locking faces.

6. The improved sound reproducing device for reproducing a plurality of recorded grooves as claimed in claim 1 wherein the device comprises: an indexing disc fixedly attached at the top end of the center shaft and rotatable with the center shaft to set the device to one of any recorded items shown on a face plate; and another one-way clutch interposed between the indexing disc and the face plate and consisting of a holding space disposed on the face plate defined by a guide face which surrounds the center shaft, a plurality of locking faces projecting radially inward from the guide face and facing opposite to the direction of rotation for sound reproduction of the record disc, a pluraltiy of slant faces each inclining from the tip end of a respective locking face toward the guide face, a plurality of locking pieces capable of moving around outside of the center shaft and which are received in the holding space, the locking pieces having a larger diameter than the extent of projection of the locking face from the guide face and a locking projection disposed on the indexing disc and extending radially around the center shaft, the locking projection having a length such that it does not extend upto the innermost tip end of the locking faces.

* * * * *